US011744257B1

(12) United States Patent
Haddock et al.

(10) Patent No.: US 11,744,257 B1
(45) Date of Patent: Sep. 5, 2023

(54) FREEZE-DRYING METHODS INCLUDING VACUUM FREEZING

(71) Applicant: Harvest Right, LLC, North Salt Lake, UT (US)

(72) Inventors: Rex C. Haddock, Bountiful, UT (US); Daniel D. Neville, Fruit Heights, UT (US)

(73) Assignee: Harvest Right, LLC, Salt Lake City, UT (US)

( * ) Notice: Subject to any disclaimer, the term of this patent is extended or adjusted under 35 U.S.C. 154(b) by 0 days.

(21) Appl. No.: 16/659,259

(22) Filed: Oct. 21, 2019

Related U.S. Application Data

(60) Provisional application No. 62/748,247, filed on Oct. 19, 2018.

(51) Int. Cl.
*A23L 3/44* (2006.01)
*A23B 7/024* (2006.01)
*F26B 5/06* (2006.01)

(52) U.S. Cl.
CPC .............. *A23B 7/024* (2013.01); *A23L 3/44* (2013.01); *F26B 5/065* (2013.01); *A23V 2002/00* (2013.01)

(58) Field of Classification Search
CPC ........... A23B 7/024; A23B 4/037; A23B 5/03; A23L 3/44; F26B 5/06; F26B 5/065
See application file for complete search history.

(56) References Cited

U.S. PATENT DOCUMENTS

| 2,400,748 | A | * | 5/1946 | Flosdorf | A23B 7/024 426/465 |
| 2,450,645 | A | * | 10/1948 | Doyle | A23B 7/06 426/510 |
| 2,508,107 | A | * | 5/1950 | Flosdorf | F26B 5/06 34/305 |
| 2,528,476 | A | | 10/1950 | Roos et al. | |
| 2,765,236 | A | * | 10/1956 | Blaine, Jr. | A23B 4/037 426/385 |
| 2,785,075 | A | * | 3/1957 | Malecki | A23B 4/037 426/573 |

(Continued)

FOREIGN PATENT DOCUMENTS

| CN | 107034183 A | 8/2017 |
| JP | 2012231778 A | 11/2012 |

(Continued)

*Primary Examiner* — Drew E Becker
(74) *Attorney, Agent, or Firm* — FisherBroyles, LLP (57) ABSTRACT

Various implementations of a freeze-drying method are described where the material is cooled by reducing the pressure in a chamber to evaporate and/or sublimate water in the material. In one implementation, the material is dried in the chamber by sublimating ice in the material to water vapor. In another implementation, the freeze-drying method includes actively cooling the chamber. In another implementation, at least a portion of the water vapor is deposited on an actively cooled interior surface of the chamber. In another implementation, the freeze-drying method includes cooling the material to −25° F. or below. In another implementation, the material is cooled at approximately ambient pressure to 30° F. or below and then cooled by reducing the pressure in the chamber.

22 Claims, 3 Drawing Sheets

(56) References Cited

U.S. PATENT DOCUMENTS

| | | | | |
|---|---|---|---|---|
| 3,169,070 | A | * | 2/1965 | Mehrlich ............... A23L 3/44 34/305 |
| 3,218,725 | A | * | 11/1965 | Lamb ................... A23L 3/44 34/287 |
| 3,219,461 | A | | 11/1965 | Lamb |
| 3,219,463 | A | * | 11/1965 | Lamb ................. A23B 7/024 34/287 |
| 3,233,333 | A | * | 2/1966 | Oppenheimer ........ F26B 5/06 34/292 |
| 3,271,874 | A | | 9/1966 | Oppenheimer |
| 3,279,199 | A | * | 10/1966 | Kapeker ............... F26B 5/06 62/55.5 |
| 3,396,041 | A | * | 8/1968 | Laskin ................ A23L 25/10 426/384 |
| 3,419,402 | A | * | 12/1968 | Laskin ................. A23L 3/44 426/385 |
| 3,871,107 | A | | 3/1975 | Broadwin |
| 4,197,658 | A | * | 4/1980 | Fraser ................. F26B 5/06 34/92 |
| 4,520,574 | A | | 6/1985 | Sugisawa et al. |
| 4,521,975 | A | | 6/1985 | Bailey |
| 4,543,734 | A | | 10/1985 | Smith |
| 4,561,191 | A | | 12/1985 | Parkinson |
| 4,612,200 | A | * | 9/1986 | Sato ................. F26B 5/048 426/385 |
| 4,780,964 | A | * | 11/1988 | Thompson, Sr. ........ F26B 5/06 34/292 |
| 4,823,478 | A | | 4/1989 | Thompson, Sr. |
| 4,978,467 | A | | 12/1990 | Shankland et al. |
| 5,398,426 | A | * | 3/1995 | Connor ................ F26B 5/06 34/289 |
| 5,727,333 | A | | 3/1998 | Folan |
| 5,822,882 | A | * | 10/1998 | Anger ................. F26B 5/06 34/296 |
| 6,122,836 | A | | 9/2000 | Tenedini et al. |
| 6,226,887 | B1 | | 5/2001 | Tenedini et al. |
| 6,327,866 | B1 | | 12/2001 | Novak et al. |
| 6,481,223 | B2 | | 11/2002 | Flynn et al. |
| 6,564,471 | B1 | * | 5/2003 | Sutherland ............. F26B 5/06 34/92 |
| 6,669,689 | B2 | | 12/2003 | Lehmann et al. |
| 6,684,524 | B1 | * | 2/2004 | Sennhenn ............. F26B 5/06 34/298 |
| 6,971,187 | B1 | | 12/2005 | Pikal et al. |
| 8,793,895 | B2 | | 8/2014 | Gasteyer, III et al. |
| 9,459,044 | B1 | * | 10/2016 | Haddock ............. F26B 5/06 |
| 9,521,856 | B2 | | 12/2016 | Kang et al. |
| 2004/0060191 | A1 | * | 4/2004 | Sennhenn ............. F26B 5/06 34/62 |
| 2005/0086950 | A1 | | 4/2005 | Khatri |
| 2005/0144804 | A1 | * | 7/2005 | Alstat ................. C02F 1/22 62/532 |
| 2007/0186437 | A1 | * | 8/2007 | Gasteyer ............. F26B 5/06 34/287 |
| 2010/0018073 | A1 | | 1/2010 | Fissore et al. |
| 2013/0239430 | A1 | * | 9/2013 | Ito .................. B01J 2/04 34/297 |
| 2013/0316054 | A1 | | 11/2013 | Wolfram |
| 2014/0069607 | A1 | | 3/2014 | Crook |
| 2014/0087057 | A1 | * | 3/2014 | Kang ............... A23C 20/025 426/385 |
| 2014/0202025 | A1 | * | 7/2014 | Ling ................. F26B 5/06 34/298 |
| 2021/0190425 | A1 | * | 6/2021 | Ganguly ............ F26B 25/008 |
| 2022/0125078 | A1 | * | 4/2022 | Porter ............... A23L 3/0155 |

FOREIGN PATENT DOCUMENTS

| | | |
|---|---|---|
| JP | 2012231780 A | 11/2012 |
| JP | 2017212890 A | 12/2017 |

* cited by examiner

FREEZE-DRYING METHODS INCLUDING VACUUM FREEZING

TECHNICAL FIELD

This relates to freeze-drying methods and apparatuses. It especially relates to freeze-drying methods including cooling a material in a chamber by reducing the pressure in the chamber to evaporate and/or sublimate water in the material. This process can be referred to as vacuum freezing.

BACKGROUND

Conventional freeze-drying, or lyophilization, involves freezing a material, placing it in a chamber at a temperature and pressure below the triple point of water (32.018° F. and 4588.35 mTorr), and removing the ice by sublimation.

Freeze-drying results in a high-quality product because of the low temperature used in processing. The original shape of the product is maintained, and the quality of the rehydrated product is excellent. Primary applications of freeze drying include biological (e.g., bacteria and yeasts), biomedical (e.g., surgical transplants), food processing (e.g., coffee) and preservation.

Freeze-drying food as a preservation method provides a number of advantages compared to other methods. Some advantages of freeze-dried foods include looking fresh, tasting fresh, staying fresh, and weighing less than fresh foods. Another advantage is that freeze-dried foods add variety to meals while being quick and easy to prepare.

After freeze-dried foods are re-hydrated, many are comparable to foods found in the freezer section of the grocery store. Because freeze-dried foods rehydrate well and taste much like frozen foods, they make meals taste much like those created using fresh foods.

The following attributes of freeze-dried foods highlight some of the main benefits of freeze-dried foods. Fresh appearance: freeze-dried foods are first frozen and then have the moisture removed so they maintain much of their original shape, texture, and appearance.

Fresh taste: freeze-dried food is not dried with heat processing so it retains more of the aroma and flavor of the original food. The freeze-drying process also maintains most of the original food's nutritional content. Freeze-drying removes the water, not the flavor.

Lasting freshness: the freeze-drying process removes water from prepared foods. The foods can be stored in bags/containers with pouches that remove or absorb oxygen. This helps keep it tasting fresh.

Low storage weight: freeze-dried foods have approximately 98 percent of their water removed, resulting in foods that typically weigh 75% to 96% less than the original food. The freeze-drying process results in foods that are exceptionally light. This makes them easy to package, transport, and store. This makes freeze-dried foods an excellent choice for camping and backpacking trips, emergency kits, and the like.

Easy preparation: the freeze-drying process allows for quick rehydration of the food, making freeze-dried foods ideal for food storage. Most freeze-dried items are reconstituted by adding warm water, waiting about five to ten minutes, and draining the excess water.

Variety: freeze-dried foods add a whole new dimension to stored foods and meals that can be created with them. For example, freeze-dried meats, cheeses, fruits, and vegetables, can be used to create favorites such as pizza or tacos, sweeteners for cereals, additions for soup bases, breakfast casseroles, desserts, and the like.

Although conventional freeze-drying processes provide numerous advantages, they also suffer from a number of problems. One problem is that the freeze-drying process is slow and can take days to complete. Another problem is that different materials respond differently to being freeze dried. This makes it difficult to provide a single process and/or apparatus that is suitable for freeze trying a wide range of materials.

SUMMARY

Various implementations of a freeze-drying method are described that can be used to reduce the overall processing time and better preserve desirable physical characteristics of the freeze-dried material, especially food products. This can be accomplished by modifying the freezing stage of the freeze-drying process to include reducing the pressure to evaporate and/or sublimate water in the material as a way to facilitate rapid cooling. The evaporation and/or sublimation of water absorbs energy from the material causing its temperature to drop precipitously.

One advantage of such a process is that it significantly reduces the processing time of the freezing stage, which reduces the overall processing time to freeze dry the material. In some implementations, the processing time for the freezing stage can be reduced by up to 60%. This can reduce the overall processing time of the freeze-drying process by up to 33%. This represents a significant time savings for users. It also makes it possible for a given freeze dryer to process a significantly greater amount of material in a given amount of time.

In some implementations, the method can be used with a wide variety of food items. For example, the method can be implemented on a general use freeze dryer supplied to residential users. The method can be designed to work with food products that are easy to freeze dry due to their ability to maintain their shape, texture, and appearance as well as those that are difficult to freeze dry because they are more susceptible to losing their shape, texture, and appearance.

In general, greater time savings can be realized by tailoring the process to a given food item. For example, more robust materials that are easier to freeze dry do not need to be cooled as much before the vacuum pump is turned on. They may only need to be cooled to just below the freezing point of water before the vacuum pump can be turned. This increases the amount of cooling provided by evaporation and/or sublimation of water in the material, which increases the speed of cooling. Less robust materials may need to be cooled to colder temperatures such as 10° F. or below before the vacuum pump is turned on. This reduces the amount of cooling provided by evaporation and/or sublimation of water in the material. Either way, significant time savings can still be realized.

In some implementations, the material is cooled in a chamber to −25° F. or below by reducing the pressure in the chamber to evaporate and/or sublimate water in the material. The material is then dried in the same chamber by sublimation of ice in the material to water vapor. The drying stage can include heating the material to increase the sublimation rate.

In some implementations, the freezing stage takes place in an actively cooled chamber. The material is frozen by reducing the pressure in the actively cooled chamber to evaporate and/or sublimate water in the material. Freezing the material in this manner allows it to reach significantly lower temperatures than would otherwise be possible. For example, the material can reach temperatures as low as −53° F.

In some implementations, at least a portion of the water vapor produced by the drying stage is collected on an interior surface of the chamber. For example, the interior surface of the chamber can be cooled so that water vapor condenses and/or desublimates upon reaching the surface.

In some implementations, the pressure in the chamber is not reduced until the material is sufficiently frozen to maintain its shape, texture, and/or appearance under the reduced pressure conditions. For example, the pressure may not be reduced until the material reaches a temperature of 30° F. or below.

In some implementations, all materials are cooled to the same temperature before reducing the pressure. For example, all materials can be cooled to 6° F. before reducing the pressure. In other implementations, different materials are cooled to different temperatures before reducing the pressure. For example, slices of a variety of green apples can be cooled to 26° F. before reducing the pressure while slices of red delicious apples can be cooled to 10° F. before reducing the pressure.

It should be appreciated that the systems, methods, and devices of this disclosure each have several innovative aspects, no single one of which is solely responsible for the described desirable attributes. The summary is provided to introduce a selection of concepts in a simplified form that are further described below in the detailed description. The summary and the background are not intended to identify key concepts or essential aspects of the disclosed subject matter, nor should they be used to constrict or limit the scope of the claims. For example, the scope of the claims should not be limited based on whether the recited subject matter includes any or all aspects noted in the summary and/or addresses any of the issues noted in the background.

DRAWINGS

The preferred and other implementations are disclosed in association with the accompanying drawings in which.

DETAILED DESCRIPTION

A number of freeze-drying methods and freeze-drying apparatuses or units are described. The methods and apparatuses are generally described in the context of freeze-drying food. It should be appreciated, however, that they can also be used in other contexts such as medical applications, pharmaceutical applications, laboratory applications, and the like.

Freeze Drying System

Figure 1:
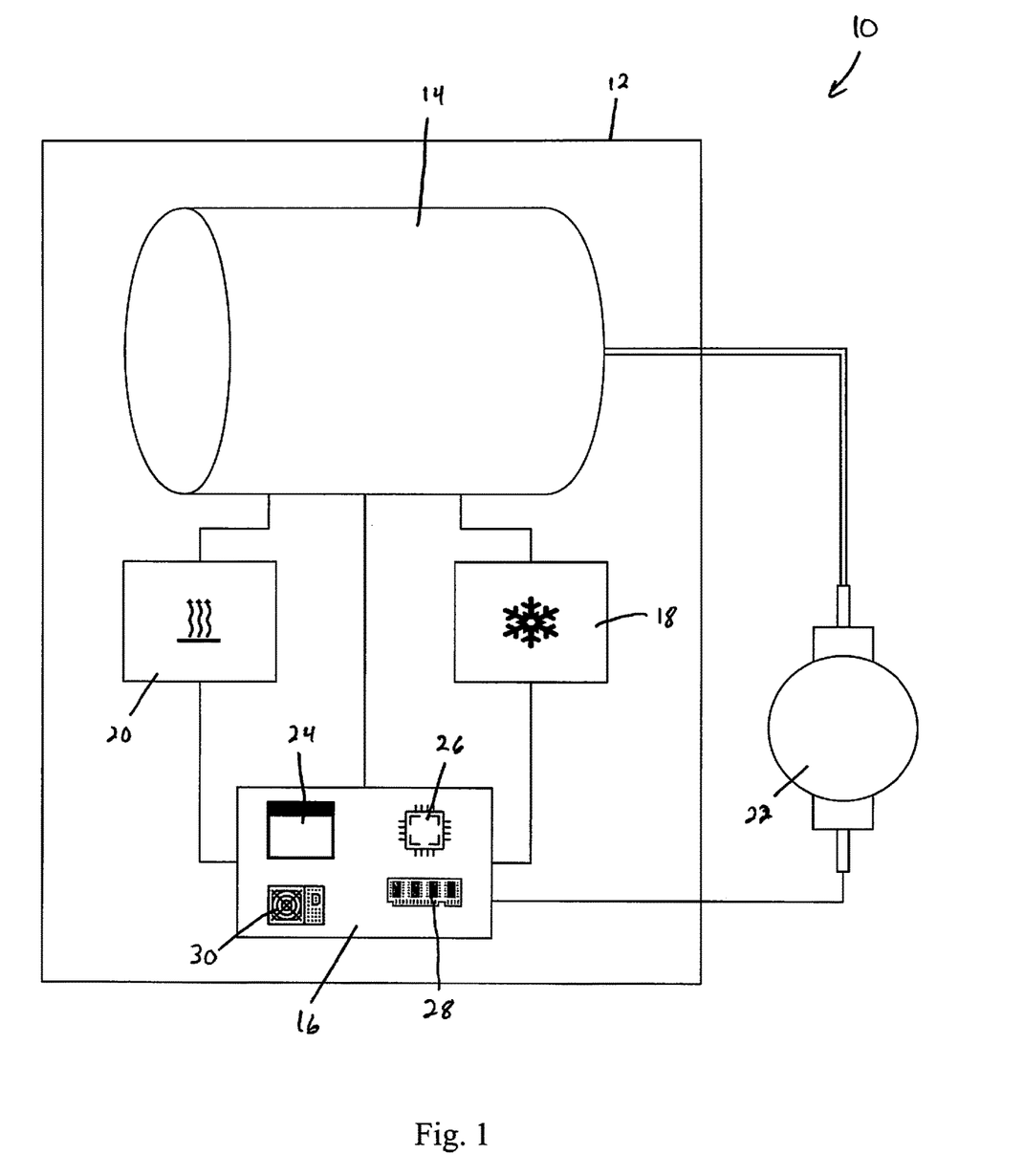
FIG. 1 is a conceptual diagram of one implementation of a freeze-drying system.

FIG. 1 is a conceptual diagram of one implementation of a freeze-drying system 10 (alternatively referred to as a freeze dryer). The freeze drying system 10 includes a housing or cabinet 12, a chamber 14 (alternatively referred to as a cooling chamber or vacuum chamber), a control system 16 (alternatively referred to as a controller), a cooling system 18 (alternatively referred to as a refrigeration system), a heating system 20, and a vacuum pump 22.

The housing 12 contains the cooling chamber 14, the control system 16, the cooling system 18, and the heating system 20. The housing 12 provides a way to keep the various subsystems and components organized in an aesthetically pleasing package. The vacuum pump 22 is positioned outside of the housing 12. The housing 12 can be made of any suitable material including metals, plastics, composites, and the like.

The chamber 14 is configured to receive the material to be freeze dried. In some implementations, the chamber 14 includes one or more shelves configured to receive corresponding trays on which the material is placed. The chamber 14 is constructed to withstand vacuum pressure applied during the freeze-drying process.

The chamber 14 can be any suitable size and shape and can be made of any suitable material. In some implementations, the chamber 14 has a cylindrical shape, which provides increased strength to withstand the vacuum pressure of the freeze-drying process. In other implementations, the chamber 14 can have other shapes such as a cubic shape, a rectangular shape, a spherical shape, and the like. The chamber 14 is preferably constructed of a sturdy metal material such as stainless steel or some other type of steel. However, the chamber 14 can also be constructed of materials such as plastics and composites.

The cooling system 18 is configured to cool the chamber 14 as required during the freeze-drying process. The cooling system 18 can be any suitable cooling system including those that rely on the vapor-compression cycle of a fluid to transfer heat from the chamber 14. In some implementations, the cooling system 18 includes an evaporator positioned adjacent to the chamber 14 and a condenser positioned away from the chamber 14. Heat from the chamber 14 is absorbed by the evaporator and released by the condenser.

It should be appreciated that the cooling system 18 can have any suitable size and/or configuration. In some implementations, the cooling system 18 is configured to cool the chamber 14 (including the interior wall surfaces of the chamber 14) to a temperature below the temperature of the material being freeze dried. In some implementations, the cooling system 18 is configured to cool the chamber 14 to any temperature from 0° F. or below to −60° F. or below. For example, the cooling system 18 can be configured to cool the chamber 14 to −25° F. or below, −30° F. or below, −35° F. or below, −40° F. or below, −45° F. or below, −50 ° F. or below, −55° F. or below, or −60° F. or below.

In some implementations, the interior walls or surfaces of the chamber 14 are used to collect the water vapor produced during the freeze-drying process. In this way, the chamber 14 also functions as a cold trap or collector for the water vapor that is removed from the frozen material. The interior walls of the chamber 14 can be cooled by the cooling system 18 to a temperature sufficient to cause the water vapor to condense and/or desublimate when it comes into contact with the walls.

In other implementations, the freeze-drying system 10 can include a collector (or collecting system) that is separate from the chamber 14. In these implementations, the interior walls of the chamber 14 are cooled less to allow the water vapor to flow out of the chamber to the separate collector.

The heating system 20 is configured to heat the material being freeze dried during the drying stage of the process. The heating system 20 can include various heating elements positioned underneath and/or above the material being freeze dried. In some implementations, the heating system 20 is configured to heat the material being freeze dried by way of conduction and/or radiation. For example, the heating system 20 can include heating elements positioned on the top of the shelves in the chamber 14 and underneath the trays with the material. It can also include heating elements positioned on the shelves directly above the trays that radiate heat onto the material.

It is generally desirable to configure the chamber 14 and the heating system 20 so that only the material is heated and not the rest of the chamber 14. This is especially the case when the interior wall surfaces of the chamber 14 are cooled to collect water vapor (through condensation and/or desublimation) produced during the drying process by the material.

In some implementations, the heating system 20 is an electrical heating system. Heat is produced by passing electricity through resistive elements that respond by becoming hot. Such a heating system provides responsive, granular control over the heating of the material in the chamber 14. It should be appreciated, however, that the heating system 20 can use any suitable method for providing heat including those that do not rely on electricity.

The vacuum pump 22 is pneumatically linked to the chamber 14 and configured to reduce the pressure in the chamber 14 as part of the freeze-drying process. When turned on, the vacuum pump 22 can produce a vacuum or near vacuum in the chamber 14. Any suitable type or size of vacuum pump can be used so long as it is capable of reducing the pressure in the chamber 14 sufficiently to accomplish the freeze-drying process.

In some implementations, the vacuum pump 22 is capable of reducing the pressure in the chamber 14 from 2000 mTorr or below to 50 mTorr or below. For example, the vacuum pump 22 can reduce the pressure in the chamber 14 to 2000 mTorr or below, to 1500 mTorr or below, to 1250 mTorr or below, to 1000 mTorr or below, to 900 mTorr or below, to 800 mTorr or below, to 700 mTorr or below, to 600 mTorr or below, to 500 mTorr or below, to 400 mTorr or below, to 300 mTorr or below, to 200 mTorr or below, or to 150 mTorr or below.

The control system 16 includes a user interface 24, processor 26, memory 28, and a power supply 30. The control system 16 is used to control the operation of the freeze-drying system 10. It is communicatively linked to and configured to control the operation of the cooling system 18, the heating system 20, and the vacuum pump 22 during the various stages of the freeze-drying process.

The control system 16 can turn the various subsystems on and off during the freeze-drying process. For example, the control system 16 can operate the various subsystems to facilitate effective freezing of the material. After the material is sufficiently frozen, the control system 16 can be used to dry it through sublimation. The freeze-drying methods described below can be implemented using the control system 16.

The user interface 24 is used to receive input from the user regarding the desired configuration for the freeze-drying system 10. The user interface 24 can also output information from the freeze-drying system 10 to the user. For example, the user interface 24 can display the status of the freeze-drying process—e.g., freezing, drying, process completed, and the like. Also, the user may be given the option to continue the freeze-drying process for an additional amount of time.

The control system 16 can also include various sensors that provide information about the status of the material being freeze dried and the components of the freeze-drying system 10. In some implementations, the control system 16 includes temperature sensors positioned in or around the chamber 14 to measure the temperature of the material being freeze dried, the interior surface(s) of the chamber 14, and the like. For example, temperatures sensors can be positioned on the top surface of the shelves to measure the temperature of the trays and/or the material on the trays.

In some implementations, the control system 16 includes pressure sensors positioned in or around the chamber 14 to measure the pressure inside the chamber 14. The control system 16 can use pressure information obtained from the pressure sensors to control the operation of the cooling system 18 and/or the heating system 20. For example, the control system 16 can use this information to control the process in the manner described in the incorporated documents (see Incorporation by Reference section below).

In some implementations, the freeze-drying system 10 can have any of the configurations described in the incorporated documents. For example, the freeze-drying system 10 can be implemented in the form of the freeze dryer 700 described in the '044 patent. It should be appreciated that the freeze-drying system 10 can include any one or more of the subsystems and/or components described here and in the incorporated documents.

It should be appreciated that the freeze-drying system 10 can have a variety of suitable configurations and be modified in a number of ways beyond what is described here. For example, the housing 12 can be configured to contain the vacuum pump 22 or contain less of the other components than what is shown in FIG. 1.

Vacuum Freezing Freeze Drying Method

The freeze-drying process includes at least a freezing stage and a drying stage. The freezing stage involves cooling the material to a sufficiently low temperature that it is ready to be dried. The drying stage involves removing water from the material through sublimation and/or desorption. Theses stages can be further subdivided as described below. The process can also include additional stages such as a pretreatment stage. A description of the various stages is provided below.

Pretreatment

Pretreatment is an optional step that includes any method of treating the material prior to entering the freeze-drying system 10. This can include concentrating the material, formulation revision (i.e., addition of components to increase stability, preserve appearance, and/or improve processing), decreasing a high-vapor-pressure solvent, or increasing the surface area. Whether to pretreat a product is often determined based on cycle time or product quality considerations.

In some implementations, materials such as food items can be pre-frozen to a certain degree before being positioned in the chamber 14. Pre-freezing the material in this manner can reduce the amount of time required to freeze the material in the chamber 14 to the low temperatures required to begin the drying stage. Pre-freezing the material rarely reduces it to a temperature sufficient to skip the freezing stage in the chamber 14.

In some implementations, the material can be pre-frozen through IQF (individual quick freezing) processes or the like. Examples of suitable food items for IQF include berries, fruits, vegetables, seafood such as shrimps and small fish, meat, poultry, pasta, cheese, and grains. One advantage of IQF processes is that they freeze the material quickly, which reduces the formation of large ice crystals in the material's cells that can destroy the membrane structures at a molecular level. This helps the material retain its shape, color, smell, and taste when it is rehydrated. Another advantage of pre-freezing the material is that large quantities of food can be pre-frozen using conventional processes, which can shorten the overall freeze-drying processing time.

Freezing

The freezing stage involves cooling the material in the chamber 14 below its triple point, which is the lowest temperature at which the solid, liquid and gas phases of water in the material can coexist. Because freeze drying is a change in state from the solid phase to the gaseous phase, the material to be freeze dried must first be adequately frozen. This ensures that sublimation rather than melting will occur in the drying stage.

The process used to freeze the material and the final temperature of the frozen material can affect the subsequent drying stage and the characteristics of the dried product. For example, rapid cooling produces small ice crystals, which better preserve the structure, texture, physical appearance, and nutritive content of the material but also take longer to dry. Slower cooling produces large ice crystals that form a network within the product which promotes faster removal of water vapor during sublimation.

There are generally two ways a material can freeze depending on its makeup. The majority of materials that are freeze dried include primarily water and other compounds dissolved or suspended in the water. Most of these are eutectics containing a mixture of substances that freeze at lower temperatures than the surrounding water. As these aqueous mixtures are cooled, changes occur in the solute concentrations of the material matrix. As cooling proceeds, the water separates from the other compounds as it changes to ice, creating higher concentration areas of the other substances.

These pockets of concentrated substances have a lower freezing temperature than the water. Although the material may appear to be frozen because of the ice that is present, in actuality it is not completely frozen until these concentrated areas are frozen. The mixture of water and various concentrations of the other substances (such as any of the various forms of sugar) form the eutectic mixture. The material is properly frozen when these eutectic mixtures are frozen. The temperature at which this occurs is the eutectic temperature of the material.

The freezing stage includes freezing the material below the eutectic temperature before beginning the drying stage. Small pockets of unfrozen areas remaining in the material can expand and compromise the structural stability of the freeze-dried product.

The second way a material can freeze occurs when the aqueous mixtures in the material undergo glass formation. These are amorphous materials that do not have a eutectic point. Instead of forming eutectics, the mixture becomes increasingly viscous as the temperature is lowered. Finally, the material reaches the glass transition point and forms a vitreous solid. The material should be maintained below this temperature to prevent melting or material collapse during the drying stage. Amorphous materials are more difficult to freeze dry.

The freezing stage can also be impacted by the manner in which the material is physically presented. For example, spreading the material out or cutting or breaking it into smaller pieces to increase the surface area can reduce the freezing and drying time.

The freezing stage can be improved by reducing the pressure in the chamber 14 to evaporate and/or sublimate water in the material. This is referred to as vacuum freezing even though the pressure may not be reduced to a full vacuum. The energy needed to evaporate and/or sublimate the water is taken from the remaining material in the form of sensible heat and converted to latent heat in the resulting water vapor. Removing sensible heat from the material causes its temperature to drop, often rapidly.

Different materials behave differently in the low-pressure environment of vacuum freezing. Some materials are robust and can be exposed to vacuum pressure at a much higher temperature without losing their shape, texture, or structural integrity. Other materials are less robust and must be frozen to a lower temperature before being exposed to vacuum pressure. In general, vacuum freezing provides the greatest time savings when the freezing process is tailored to a given material—i.e., the material is exposed to vacuum pressure at the highest temperature possible depending on the material. However, vacuum freezing can still provide significant processing time reductions when the freezing process is a universal or near universal process suitable for a wide range of materials.

In some implementations, the material is cooled at or near ambient pressure in the chamber 14 before the vacuum pump 22 is turned on. For example, before the vacuum pump 22 is turned on, the material can be cooled at or near ambient pressure in the chamber 14 to any temperature from 32° F. or below to 0° F. or below Likewise, before the vacuum pump 22 is turned on, the material can be cooled at or near ambient pressure in the chamber 14 to 32° F. or below, 30° F. or below, 28° F. or below, 26° F. or below, 24° F. or below, 22° F. or below, 20° F. or below, 18° F. or below, 16° F. or below, 14° F. or below, 12° F. or below, 10° F. or below, 8° F. or below, 6° F. or below, 4° F. or below, 2° F. or below, or 0° F. or below. The higher temperatures are generally more suitable for more robust materials and not for a wide range of materials while the lower temperatures, especially those below 10° F., are more suitable for a wide range of materials.

The material can be cooled in the chamber 14 to any suitable temperature. In some implementations, the material is cooled to any temperature from 0° F. or below to −50° F. or below. Vacuum freezing makes it possible to cool the material to a much lower temperature than can be achieved using conventional freezing processes. For example, vacuum freezing can be used to cool the material to −36° F. or below. Freezing the material to such low temperatures is a way to ensure that the material is below its eutectic temperature or glass transition point making the freeze-drying process much easier and faster.

Vacuum cooling can substantially increase the cooling rate of the material. When the vacuum pump 22 is turned on, the cooling rate can increase significantly. In some implementations, the cooling rate with the vacuum pump 22 turned on is any rate from at least 0.25° F./min to at least 1° F./min. In other implementations, the cooling rate with the vacuum pump 22 turned on is at least 0.25° F./min, at least 0.5° F./min, at least 0.75° F./min, or at least 1° F./min.

One of the advantages of vacuum freezing is that it can reduce the processing time of the freezing stage by up to 60%. In some implementations, vacuum freezing reduces the processing time of the freezing stage compared to a conventional process by 10% or more to 60% or more. In some implementations, vacuum freezing reduces the processing time of the freezing stage by at least 10%, at least 15%, at least 20%, at least 25%, at least 30%, at least 35%, at least 40%, at least 45%, at least 50%, at least 55%, or at least 60%.

It should be noted that the vacuum pump 22 is turned on in at least part of the freezing stage and the drying stage. However, vacuum freezing can be distinguished from the drying stage because the material is not heated during vacuum freezing but it is heated during the drying stage. For example, vacuum freezing can be used to reduce the temperature of the material to any temperature from −10° F. or below to −50° F. (e.g., −30° F.) or below before heating the material as part of the drying stage. Vacuum freezing can also be used to cool the material for any number of minutes from at least 10 minutes to at least 30 minutes before heating the material as part of the drying stage. Vacuum freezing can also be used to cool the material any number of degrees from at least 10° F. to at least 35° F. (this means reducing the temperature by at least this many degrees) before heating the material as part of the drying stage.

Primary Drying or Sublimation Drying

The drying stage can be divided into two substages—i.e., primary drying or sublimation drying and secondary drying or desorption drying. Primary drying is the stage where free water in the form of ice is removed from the material by way of sublimation. Secondary drying is the stage where bound water is removed from the material. Each is described in greater detail.

During the primary drying stage, the pressure is lowered through the application of a high vacuum by the vacuum pump 22, and heat is applied by the heating system 20 to provide energy for the ice to sublime. The primary drying stage removes about 95% of the water present in the material. This stage is relatively slow and can take anywhere from several hours to two days.

The temperature and pressure of the material and/or the interior of the chamber 14 are controlled by the control system 16 to establish the conditions for which ice can be removed via sublimation resulting in a dry, structurally intact product. The rate of sublimation of ice from the frozen material depends on the difference in vapor pressure of the material compared to the vapor pressure of the collector, which in this case is the interior surface of the chamber 14.

Water molecules migrate from the higher-pressure area to the lower pressure area. The vapor pressure is related to temperature so the temperature of the walls of the chamber 14 to be lower than the temperature of the material. The temperature at which the material is freeze dried is balanced between the temperature that maintains the frozen integrity of the material and the temperature that maximizes the vapor pressure of the material. Most materials are frozen well below their eutectic or glass transition point, and then the temperature is raised to just below the temperature where they maintain their frozen integrity. In some implementations, the vacuum pump 22 remains on after the freezing stage and the temperature is adjust in the described manner using the heating system 20.

The vacuum pump 22 lowers the pressure in the chamber 14 to the values described above. The interior walls of the chamber 14 act as the cold trap that collects the water vapor removed from the frozen material. The vacuum pump 22 removes gases other than water that are not collected by the interior walls of the chamber 14.

The vapor pressure of the material causes the sublimation of the water vapor molecules from the frozen material to the internal walls of the chamber 14. The water vapor molecules have a natural affinity to move toward the internal walls because its vapor pressure is lower than that of the material. Therefore, the temperature of the internal walls should be significantly lower than the temperature of the material.

Heat energy is provided to the material to accelerate the drying process. Almost ten times as much energy is required to sublime a gram of water from the frozen to the gaseous state as is required to freeze a gram of water. Accordingly, applying heat to the material encourages removal of water in the form of water vapor from the frozen material.

The amount of heat supplied by the heating system 20 is controlled by the control system 16. Too much heat can warm the material above its eutectic or collapse temperature. It should be appreciated that heat can be applied in a number of ways. In some implementations, heat is applied directly to the material through the shelf. The heat is conducted from a heating element through the shelf and tray to the material. In some implementations, heat radiates from a heating element positioned above the material. For example, each shelf can include a heating element positioned above the material that radiates heat onto the material.

Heat input to the material can be enhanced by controlling the pressure in the system at some level above the ultimate capability of the vacuum pump 22. For example, the control system 16 can be used to automatically regulate the pressure to the desired level. This allows additional gas molecules to reside in the system thereby improving the conduction of heat to the material, which improves the sublimation rate, reduces process time, and lowers associated energy costs. Of course, the pressure should not exceed the ice vapor pressure of the material it may begin to melt.

During the primary drying stage, an ice front moves through the material as the ice is remove through sublimation. The ice front generally moves from an exterior surface inward—e.g., from the top of the material to the bottom. As the front moves through the material, the sublimating water vapor must pass through the dried material formed behind the ice front as it is being evacuated from the material. The less amount of dried material the water vapor must pass through, the faster the molecules will sublimate, resulting in a faster overall processing time.

Secondary Drying or Desorption Drying

After the primary drying stage is complete and all the ice has sublimed, there may be some bound water present in the material. The material appears dry, but the residual bound moisture content can be as high as 7-8 wt %. The secondary drying stage is performed at a higher temperature to sublimate the bound moisture and reduce the residual moisture content of the material. Because the majority of the water in the sample has already been sublimated, the material temperature can rise above the eutectic point without melting. This process is isothermal desorption because the bound water is desorbed from the material.

In some implementations, secondary drying is performed at a material temperature higher than ambient but compatible with the sensitivity of the material. The other conditions such as pressure and temperature of the internal walls of the chamber 14 remain the same. In some implementations, because the process is desorptive, the vacuum can be as low as possible and the internal wall temperature can be as cold as possible. In some implementations, secondary drying is carried out for approximately ⅓ to ½ the time required for primary drying.

At the end of the freeze-drying process, the final residual water content in the material is extremely low, around 1% to 4%.

Illustrative Freeze-Drying Methods

The freeze-drying method generally includes freezing the material and then drying it. The material is frozen below its eutectic temperature by, among other things, reducing the pressure in the chamber to evaporate and/or sublimate water in the material. The internal walls of the chamber 14 are also cooled to a temperature below the temperature of the material.

After the material is adequately frozen, it is heated and primary drying begins and continues until the entire frozen matrix appears dry. Water vapor removed from the material is collected on the internal walls of the chamber 14.

Figure 2:
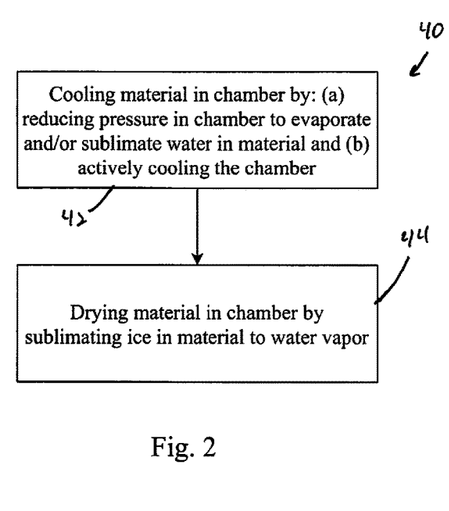
FIGS. 2-5 are flow diagrams of various implementations of freeze-drying methods.

FIG. 2 is a flow diagram of one implementation of a freeze-drying method 40 including a freezing stage 42 and a drying stage 44. The freezing stage 42 includes cooling the material in the chamber 14 by: (a) reducing the pressure in the chamber with the vacuum pump 22 to evaporate and/or sublimate water in the material and (b) actively cooling the chamber using the cooling system 18. The drying stage 44 includes drying the material in the chamber 14 by sublimating ice in the material to water vapor.

Figure 3:
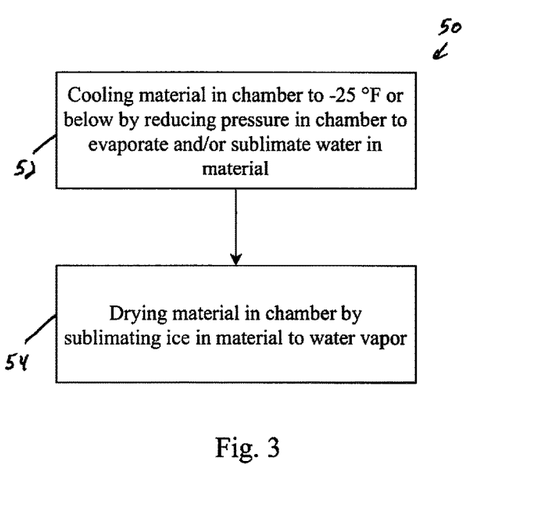

FIG. 3 is a flow diagram of another implementation of a freeze-drying method 50 including a freezing stage 52 in a drying stage 54. The freezing stage 52 includes cooling the material in the chamber 14 to −25° F. or below by reducing the pressure in the chamber 14 to evaporate and/or sublimate water in the material. The drying stage 54 includes drying the material in the chamber 14 by sublimating ice in the material to water vapor.

Figure 4:
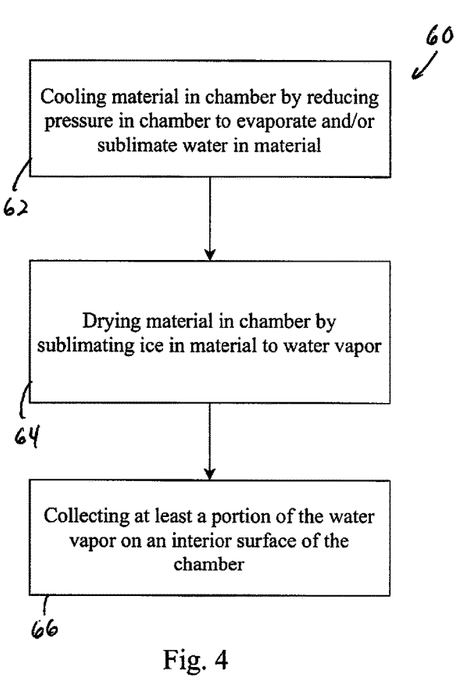

FIG. 4 is a flow diagram of another implementation of a freeze-drying method 60 including a freezing stage 62, a drying step 64, and a water vapor collecting step 66. The freezing stage 62 includes cooling the material in the chamber 14 by reducing the pressure in the chamber to evaporate and/or sublimate water in the material. The drying step 64 includes drying the material in the chamber 14 by sublimating ice in the material to water vapor. The water vapor collecting step 66 includes collecting at least a portion of the water vapor on an interior surface of the chamber 14.

Figure 5:
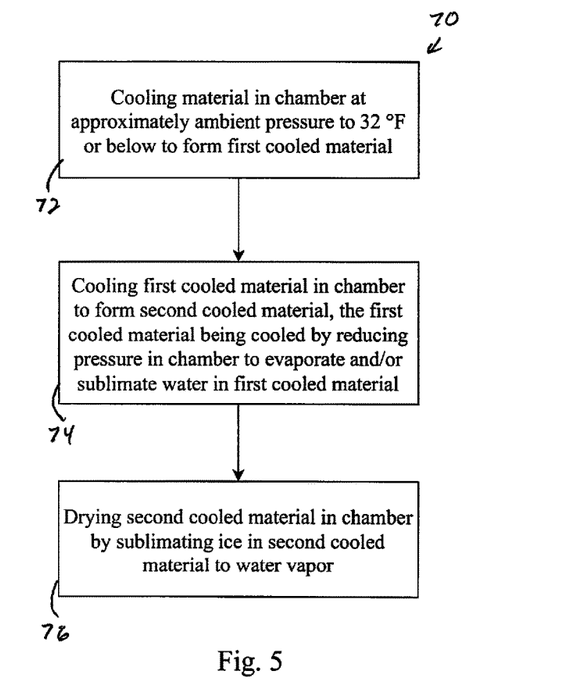

FIG. 5 is a flow diagram of another implementation of a freeze-drying method 70 including cooling steps 72, 74 and a drying stage 76. The cooling step 72 includes cooling the material in the chamber 14 at approximately ambient pressure to 32° F. or below to form a first cooled material. The cooling step 74 includes cooling the first cooled material in the chamber 14 to form a second cooled material. The first cooled material is cooled by reducing the pressure in the chamber 14 to evaporate and/or sublimate water in the first cooled material. The drying stage 76 includes drying the second cooled material in the chamber 14 by sublimating ice in the second cooled material to water vapor.

It should be appreciated that any of the freeze-drying methods 40, 50, 60, 70 can be modified in a number of ways. For example, the methods 40, 50, 60, 70 can be modified to include any of the processing steps and/or parameters described in this document and the incorporated documents.

EXAMPLES

The following examples are provided to further illustrate the disclosed subject matter. They should not be used to constrict or limit the scope of the claims in any way.

Example 1

The performance of a conventional ambient pressure freezing process was compared to a vacuum assisted freezing process using a medium sized premium Harvest Right freeze dryer (available from Harvest Right LLC, North Salt Lake, Utah). The freeze dryer included a housing, a cylindrical chamber, a control system, a cooling system configured to actively cool the chamber, a heater configured to heat the frozen food to facilitate sublimation, and a 7-cfm, oil-based vacuum pump. All of the components were housed in a single unit except the vacuum pump, which was positioned outside the housing and pneumatically coupled to the chamber with a 36-inch vacuum hose having a ¾-inch nominal interior diameter. There were four shelves in the chamber each of which was sized to receive and hold a stainless-steel food tray sized 7.5-inch W×18-inch L×0.75-inch H. The overall dimensions of the freeze dryer housing were approximately 18-inch W×21.25-inch D×28.5-inch H.

The freezing processes were tested using apple slices. Each apple was cut into 16 slices with the skins left on. Each tray was filled with approximately 35 apple slices positioned on their sides without overlapping. The apple slices used for each process appeared to be identical. The core temperature of the apple slices was measured using a thermometer (available from Fluke Corporation, Everett, Wash.) inserted into the slices.

For each freezing process, the trays with apple slices were placed in the freeze dryer and frozen using the cooling system for 1,380 minutes. The conventional freezing process was operated at ambient pressure until the process was completed. The vacuum assisted freezing process was operated at ambient pressure until the water in the apple slices was sufficiently frozen to retain the shape of the slices under vacuum pressure, which corresponded to an apple slice core temperature of approximately 6° F. The vacuum pump was turned on at this point and left on until the process was completed. The vacuum pump caused the pressure in the chamber to quickly drop to below 500 mTorr.

Figure 6:
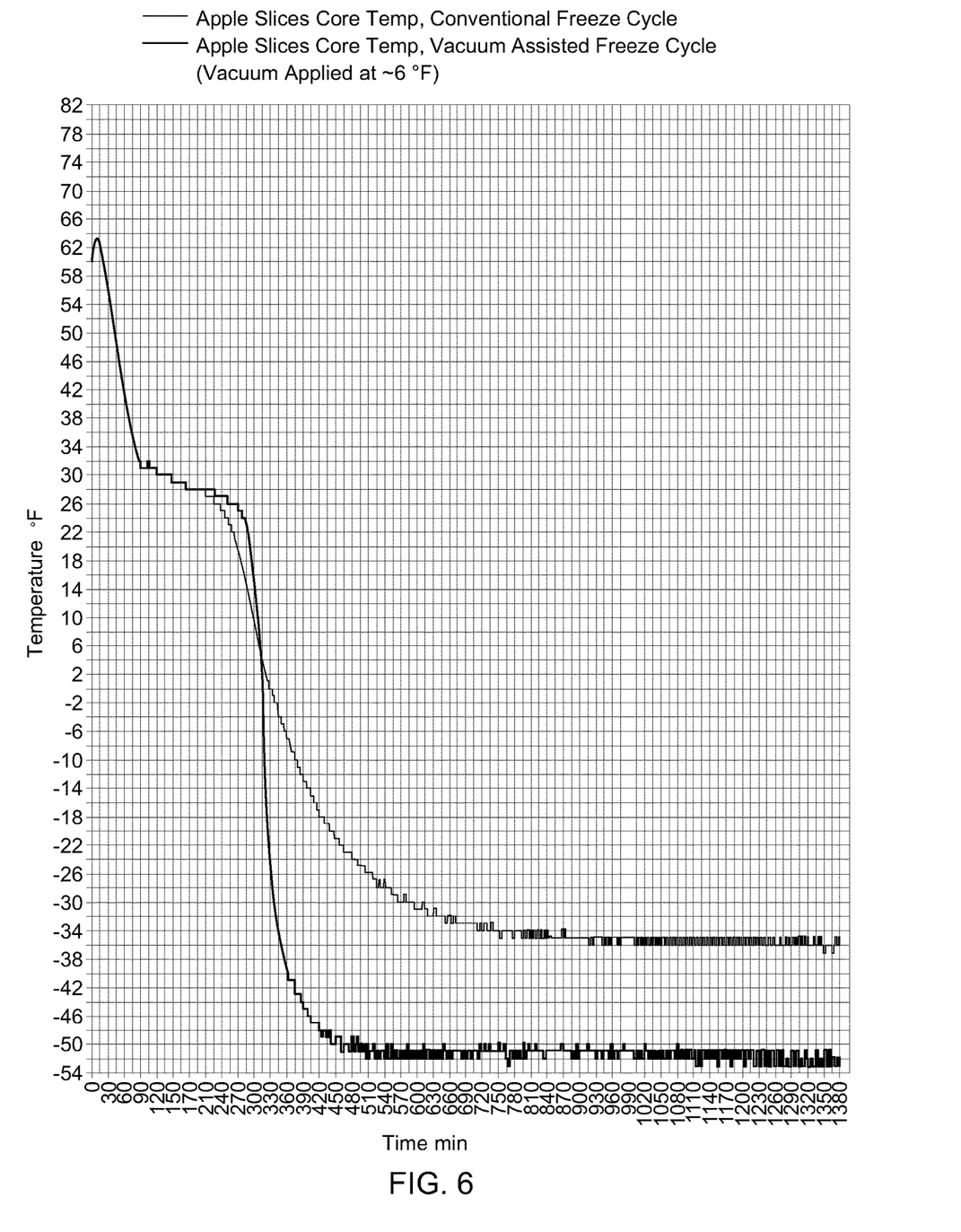
FIG. 6 is a graph showing the time vs internal temperature of apple slices cooled at ambient pressure and cooled in a vacuum.

FIG. 6 is a graph of the core temperature measurements for each process. The graph shows that the core temperature of the apple slices dropped rapidly after the vacuum pump was turned on. In fact, the core temperature dropped at a rate of approximately 1.08° F./min (i.e., 41° F. over 38 minutes). This was significantly faster than the rate at which the core temperature of the apple slices dropped in the conventional freezing process.

The difference in the temperature drop rates can at least partially be explained by increased evaporation and/or sublimation of water in the vacuum assisted freezing process. When the vacuum pump is turned on, the pressure drops causing increased evaporation of any liquid water and sublimation of any ice. The energy needed to evaporate and/or sublimate the water is taken from the apple slices in the form of sensible heat and converted to latent heat in the resulting water vapor. Sensible heat removal from the apple slices causes their temperature to drop.

The graph also shows that the temperature of the apple slices in the vacuum assisted freezing process reached a much lower steady state temperature (−53° F.) compared to the conventional freezing process (−36° F.). The lower temperature provides a number of advantages such as: 1) when product reaches temperatures close to its eutectic temperature (temperature at which the product freezes and not just the temperature of water freezing) it increases sublimation effectiveness; 2) colder temperatures minimize or prevent distortion of the product shape during the sublimation process.

The graph also shows that the vacuum assisted freezing process significantly reduces the processing time for the apple slices to reach a desired temperature. For example, it takes approximately 345 minutes for the apple slices to reach −36° F. in the vacuum assisted freezing process while it takes 915 minutes to reach the same temperature in the conventional freezing process. This is a savings of 9.5 hours or approximately 62%. It also reduces the overall freeze-drying processing time (freezing process and drying process). For example, a conventional freeze-drying process takes 28 hours. Reducing it by 9.5 hours is a 33% overall reduction in processing time.

Example 2

The apple slices frozen using the processes described in Example 1 are dried using the same freeze dryer. The freeze-dried apple slices resulting from both the conventional freezing process and the vacuum assisted freezing process are visually similar and have similar textures. This shows that the vacuum assisted freezing process does not adversely affect the final freeze-dried product.

Illustrative Implementations

The following is a description of various implementations of the disclosed subject matter. Each implementation may include one or more of the various features, characteristics, or advantages of the disclosed subject matter. The implementations are intended to illustrate a few aspects of the disclosed subject matter and should not be considered a comprehensive or exhaustive description of all possible implementations.

P1. A freeze-drying method comprising: cooling a material in a chamber by: (a) reducing the pressure in the chamber to evaporate and/or sublimate water in the material and (b) actively cooling the chamber; and drying the material in the chamber by sublimating ice in the material to water vapor.

P2. The freeze-drying method of paragraph P1 comprising cooling the material in the chamber to 0° F. or below (or to any temperature from 0° F. or below to −50° F. or below).

P3. The freeze-drying method of any one of paragraphs P1-P2 comprising collecting at least a portion of the water vapor on an interior surface of the chamber.

P4. The freeze-drying method of any one of paragraphs P1-P3 comprising: cooling the material in the chamber at approximately ambient pressure to 32° F. or below (or to any temperature from 32° F. or below to 0° F. or below) to form a first cooled material; cooling the first cooled material in the chamber to form a second cooled material, the first cooled material being cooled by: (a) reducing the pressure in the chamber to evaporate and/or sublimate water in the first cooled material and (b) actively cooling the chamber; and drying the second cooled material in the chamber by sublimating ice in the second cooled material to water vapor.

P5. The freeze-drying method of any one of paragraphs P1-P4 wherein cooling the material in the chamber comprises reducing the pressure in the chamber to 2000 mTorr or below (or to any pressure from 2000 mTorr or below to 500 mTorr or below).

P6. The freeze-drying method of paragraph P5 wherein cooling the material in the chamber comprises reducing the pressure in the chamber from approximately ambient pressure to 2000 mTorr or below (or to any pressure from 2000 mTorr or below to 500 mTorr or below) in a single step.

P7. The freeze-drying method of any one of paragraphs P1-P6 wherein drying the material in the chamber includes heating the material in the chamber to sublimate ice in the material to water vapor.

P8. The freeze-drying method of paragraph P7 comprising cooling the material to −10° F. or below (or to any temperature from −10° F. or below to −50° F. or below) before heating the material.

P9. The freeze-drying method of paragraph P7 comprising cooling the material for at least 10 minutes (or any number of minutes from at least 10 min to at least 30 min) before heating the material.

P10. The freeze-drying method of paragraph P7 comprising cooling the material at least 20° F. (or any number of degrees from at least 10° F. to at least 35° F.) before heating the material.

P11. The freeze-drying method of any one of paragraphs P1-P10 wherein actively cooling the chamber comprises cooling an interior surface of the chamber to 0° F. or below (or to a temperature below the temperature of the material or to any temperature from 0° F. or below to −60° F. or below).

P12. The freeze-drying method of any one of paragraphs P1-P11 wherein cooling the material in the chamber lowers the temperature of the material at a rate of at least 0.25° F./min (or at any rate from at least 0.25° F./min to at least 1° F./min).

P13. A freeze-drying method comprising: cooling a material in a chamber to −25° F. or below (or to any temperature from −25° F. or below to −50° F. or below) by reducing the pressure in the chamber to evaporate and/or sublimate water in the material; and drying the material in the chamber by sublimating ice in the material to water vapor.

P14. The freeze-drying method of paragraph P13 comprising collecting at least a portion of the water vapor on an interior surface of the chamber.

P15. The freeze-drying method of any one of paragraphs P13-P14 comprising: cooling the material in the chamber at approximately ambient pressure to 32° F. or below (or to any temperature from 32° F. or below to 0° F. or below) to form a first cooled material; cooling the first cooled material in the chamber to −25° F. (or to any temperature from −25° F. or below to −50° F. or below) to form a second cooled material, the first cooled material being cooled by reducing the pressure in the chamber to evaporate and/or sublimate water in the first cooled material; and drying the second cooled material by sublimating ice in the second cooled material to water vapor.

P16. The freeze-drying method of any one of paragraphs P13-P15 wherein cooling the material in the chamber comprises reducing the pressure in the chamber to 2000 mTorr or below (or to any pressure from 2000 mTorr or below to 500 mTorr or below).

P17. The freeze-drying method of paragraph P16 wherein cooling the material in the chamber comprises reducing the pressure in the chamber from approximately ambient pressure to 2000 mTorr or below (or to any pressure from 2000 mTorr or below to 500 mTorr or below) in a single step.

P18. The freeze-drying method of any one of paragraphs P13-P17 wherein drying the material in the chamber includes heating the material in the chamber to sublimate ice in the material to water vapor.

P19. The freeze-drying method of paragraph P18 comprising cooling the material to −10° F. or below (or to any temperature from −10° F. or below to −50° F. or below) before heating the material.

P20. The freeze-drying method of paragraph P18 comprising cooling the material for at least 10 minutes (or any number of minutes from at least 10 min to at least 30 min) before heating the material.

P21. The freeze-drying method of paragraph P18 comprising cooling the material at least 20° F. (or any number of degrees from at least 10° F. to at least 35° F.) before heating the material.

P22. The freeze-drying method of any one of paragraphs P13-P21 wherein actively cooling an interior surface of the chamber to −30° F. or below (or to a temperature below the temperature of the material or to any temperature from −30° F. or below to −60° F. or below).

P23. The freeze-drying method of any one of paragraphs P13-P22 wherein cooling the material in the chamber lowers the temperature of the material at a rate of at least 0.25° F./min (or at any rate from at least 0.25° F./min to at least 1° F./min).

P24. A freeze-drying method comprising: cooling a material in a chamber by reducing the pressure in the chamber to evaporate and/or sublimate water in the material; drying the material in the chamber by sublimating ice in the material to water vapor; and collecting at least a portion of the water vapor on an interior surface of the chamber.

P25. The freeze-drying method of paragraph P24 comprising cooling the material in the chamber to 0° F. or below (or to any temperature from 0° F. or below to −50° F. or below).

P26. The freeze-drying method of any one of paragraphs P24-P25 comprising: cooling the material in the chamber at approximately ambient pressure to 32° F. or below (or to any temperature from 32° F. or below to 0° F. or below) to form a first cooled material; cooling the first cooled material in the chamber to form a second cooled material, the first cooled material being cooled by reducing the pressure in the chamber to evaporate and/or sublimate water in the first cooled material; and drying the second cooled material in the chamber by sublimating ice in the second cooled material to water vapor.

P27. The freeze-drying method of any one of paragraphs P24-P26 wherein cooling the material in the chamber comprises reducing the pressure in the chamber to 2000 mTorr or below (or to any pressure from 2000 mTorr or below to 500 mTorr or below).

P28. The freeze-drying method of paragraph P27 wherein cooling the material in the chamber comprises reducing the pressure in the chamber from approximately ambient pressure to 2000 mTorr or below (or to any pressure from 2000 mTorr or below to 500 mTorr or below) in a single step.

P29. The freeze-drying method of any one of paragraphs P24-P28 wherein drying the material in the chamber includes heating the material in the chamber to sublimate ice in the material to water vapor.

P30. The freeze-drying method of paragraph P29 comprising cooling the material to −10° F. or below (or to any temperature from −10° F. or below to −50° F. or below) before heating the material.

P31. The freeze-drying method of paragraph P29 comprising cooling the material for at least 10 minutes (or any number of minutes from at least 10 min to at least 30 min) before heating the material.

P32. The freeze-drying method of paragraph P29 comprising cooling the material at least 20° F. (or any number of degrees from at least 10° F. to at least 35° F.) before heating the material.

P33. The freeze-drying method of any one of paragraphs P24-P32 comprising actively cooling the interior surface of the chamber (for example, to a temperature below the temperature of the material or to any temperature from 0° F. or below to −60° F. or below).

P34. The freeze-drying method of any one of paragraphs P24-P33 wherein cooling the material in the chamber lowers the temperature of the material at a rate of at least 0.25° F./min (or at any rate from at least 0.25° F./min to at least 1° F./min).

P35. A freeze-drying method comprising: cooling a material in a chamber at approximately ambient pressure to 32° F. or below (or to any temperature from 32° F. or below to 0° F. or below) to form a first cooled material; cooling the first cooled material in the chamber to form a second cooled material, the first cooled material being cooled by reducing the pressure in the chamber to evaporate and/or sublimate water in the first cooled material; and drying the second cooled material in the chamber by sublimating ice in the second cooled material to water vapor.

P36. The freeze-drying method of paragraph P35 comprising cooling the first cooled material in the chamber to 0° F. or below (or to any temperature from 0° F. or below to −50° F. or below).

P37. The freeze-drying method of any one of paragraphs P35-P36 wherein cooling the first cooled material in the chamber comprises reducing the pressure in the chamber to 2000 mTorr or below (or to any pressure from 2000 mTorr or below to 500 mTorr or below).

P38. The freeze-drying method of paragraph P37 wherein cooling the first cooled material in the chamber comprises reducing the pressure in the chamber from approximately ambient pressure to 2000 mTorr or below (or to any pressure from 2000 mTorr or below to 500 mTorr or below) in a single step.

P39. The freeze-drying method of any one of paragraphs P35-P38 wherein drying the second cooled material in the chamber includes heating the second cooled material in the chamber to sublimate ice in the second cooled material to water vapor.

P40. The freeze-drying method of paragraph P39 comprising cooling the first cooled material in the chamber to −10° F. or below (or to any temperature from −10° F. or below to −50° F. or below) to form the second cooled material.

P41. The freeze-drying method of paragraph P39 comprising cooling the first cooled material for at least 10 minutes (or any number of minutes from at least 10 min to at least 30 min) to form the second cooled material.

P42. The freeze-drying method of paragraph P39 comprising cooling the first cooled material in the chamber at least 20° F. (or any number of degrees from at least 10° F. to at least 35° F.) to form the second cooled material.

P43. The freeze-drying method of any one of paragraphs P35-P42 wherein cooling the first cooled material in the chamber comprises actively cooling an interior surface of the chamber (for example, to a temperature below the temperature of the first cooled material or to any temperature from 0° F. or below to −60° F. or below).

P44. The freeze-drying method of any one of paragraphs P35-P43 wherein cooling the first cooled material in the chamber lowers the temperature of the first cooled material at a rate of at least 0.25° F./min (or at any rate from at least 0.25° F./min to at least 1° F./min).

General Terminology and Interpretative Conventions

Any methods described in the claims or specification should not be interpreted to require the steps to be performed in a specific order unless expressly stated otherwise. Also, the methods should be interpreted to provide support to perform the recited steps in any order unless expressly stated otherwise.

Certain features described in the context of separate implementations can also be implemented in combination in a single implementation. Conversely, various features that are described in the context of a single implementation can also be implemented in multiple implementations separately or in any suitable subcombination. Moreover, although features may be described above in certain combinations and even initially claimed as such, one or more features from a claimed combination can be excised from the combination, and the claimed combination may be directed to a subcombination or variation of a subcombination.

Articles such as "the," "a," and "an" can connote the singular or plural. Also, the word "or" when used without a preceding "either" (or other similar language indicating that "or" is unequivocally meant to be exclusive—e.g., only one of x or y, etc.) shall be interpreted to be inclusive (e.g., "x or y" means one or both x or y).

The term "and/or" shall also be interpreted to be inclusive (e.g., "x and/or y" means one or both x or y). In situations where "and/or" or "or" are used as a conjunction for a group of three or more items, the group should be interpreted to include one item alone, all the items together, or any combination or number of the items.

The terms have, having, include, and including should be interpreted to be synonymous with the terms comprise and comprising. The use of these terms should also be understood as disclosing and providing support for narrower alternative implementations where these terms are replaced by "consisting" or "consisting essentially of."

Unless otherwise indicated, all numbers or expressions, such as those expressing dimensions, physical characteristics, and the like, used in the specification (other than the claims) are understood to be modified in all instances by the term "approximately." At the very least, and not as an attempt to limit the application of the doctrine of equivalents to the claims, each numerical parameter recited in the specification or claims which is modified by the term "approximately" should be construed in light of the number of recited significant digits and by applying ordinary rounding techniques.

All disclosed ranges are to be understood to encompass and provide support for claims that recite any subranges or any and all individual values subsumed by each range. For example, a stated range of 1 to 10 should be considered to include and provide support for claims that recite any and all subranges or individual values that are between and/or inclusive of the minimum value of 1 and the maximum value of 10; that is, all subranges beginning with a minimum value of 1 or more and ending with a maximum value of 10 or less (e.g., 5.5 to 10, 2.34 to 3.56, and so forth) or any values from 1 to 10 (e.g., 3, 5.8, 9.9994, and so forth), which values can be expressed alone or as a minimum value (e.g., at least 5.8) or a maximum value (e.g., no more than 9.9994).

All disclosed numerical values are to be understood as being variable from 0-100% in either direction and thus provide support for claims that recite such values (either alone or as a minimum or a maximum—e.g., at least <value> or no more than <value>) or any ranges or subranges that can be formed by such values. For example, a stated numerical value of 8 should be understood to vary from 0 to 16 (100% in either direction) and provide support for claims that recite the range itself (e.g., 0 to 16), any subrange within the range (e.g., 2 to 12.5) or any individual value within that range expressed individually (e.g., 15.2), as a minimum value (e.g., at least 4.3), or as a maximum value (e.g., no more than 12.4).

The terms recited in the claims should be given their ordinary and customary meaning as determined by reference to relevant entries in widely used general dictionaries and/or relevant technical dictionaries, commonly understood meanings by those in the art, etc., with the understanding that the broadest meaning imparted by any one or combination of these sources should be given to the claim terms (e.g., two or more relevant dictionary entries should be combined to provide the broadest meaning of the combination of entries, etc.) subject only to the following exceptions: (a) if a term is used in a manner that is more expansive than its ordinary and customary meaning, the term should be given its ordinary and customary meaning plus the additional expansive meaning, or (b) if a term has been explicitly defined to have a different meaning by reciting the term followed by the phrase "as used in this document shall mean" or similar language (e.g., "this term means," "this term is defined as," "for the purposes of this disclosure this term shall mean," etc.). References to specific examples, use of "i.e.," use of the word "invention," etc., are not meant to invoke exception (b) or otherwise restrict the scope of the recited claim terms. Other than situations where exception (b) applies, nothing contained in this document should be considered a disclaimer or disavowal of claim scope.

The subject matter recited in the claims is not coextensive with and should not be interpreted to be coextensive with any implementation, feature, or combination of features described or illustrated in this document. This is true even if only a single implementation of the feature or combination of features is illustrated and described.

Joining or Fastening Terminology and Interpretative Conventions

The term "coupled" means the joining of two members directly or indirectly to one another. Such joining may be stationary in nature or movable in nature. Such joining may be achieved with the two members or the two members and any additional intermediate members being integrally formed as a single unitary body with one another or with the two members or the two members and any additional intermediate member being attached to one another. Such joining may be permanent in nature or alternatively may be removable or releasable in nature.

The term "coupled" includes joining that is permanent in nature or releasable and/or removable in nature. Permanent joining refers to joining the components together in a manner that is not capable of being reversed or returned to the original condition. Releasable joining refers to joining the components together in a manner that is capable of being reversed or returned to the original condition.

Releasable joining can be further categorized based on the difficulty of releasing the components and/or whether the components are released as part of their ordinary operation and/or use. Readily or easily releasable joining refers to joining that can be readily, easily, and/or promptly released with little or no difficulty or effort. Difficult or hard to release joining refers to joining that is difficult, hard, or arduous to release and/or requires substantial effort to release. The joining can be released or intended to be released as part of the ordinary operation and/or use of the components or only in extraordinary situations and/or circumstances. In the latter case, the joining can be intended to remain joined for a long, indefinite period until the extraordinary circumstances arise.

It should be appreciated that the components can be joined together using any type of fastening method and/or fastener. The fastening method refers to the way the components are joined. A fastener is generally a separate component used in a mechanical fastening method to mechanically join the components together. A list of examples of fastening methods and/or fasteners are given below. The list is divided according to whether the fastening method and/or fastener is generally permanent, readily released, or difficult to release.

Examples of permanent fastening methods include welding, soldering, brazing, crimping, riveting, stapling, stitching, some types of nailing, some types of adhering, and some types of cementing. Examples of permanent fasteners include some types of nails, some types of dowel pins, most types of rivets, most types of staples, stitches, most types of structural ties, and toggle bolts.

Examples of readily releasable fastening methods include clamping, pinning, clipping, latching, clasping, buttoning, zipping, buckling, and tying. Examples of readily releasable fasteners include snap fasteners, retainer rings, circlips, split pin, linchpins, R-pins, clevis fasteners, cotter pins, latches, hook and loop fasteners (VELCRO), hook and eye fasteners, push pins, clips, clasps, clamps, zip ties, zippers, buttons, buckles, split pin fasteners, and/or conformat fasteners.

Examples of difficult to release fastening methods include bolting, screwing, most types of threaded fastening, and some types of nailing. Examples of difficult to release fasteners include bolts, screws, most types of threaded fasteners, some types of nails, some types of dowel pins, a few types of rivets, a few types of structural ties.

It should be appreciated that the fastening methods and fasteners are categorized above based on their most common configurations and/or applications. The fastening methods and fasteners can fall into other categories or multiple categories depending on their specific configurations and/or applications. For example, rope, string, wire, cable, chain, and the like can be permanent, readily releasable, or difficult to release depending on the application.

Drawing Related Terminology and Interpretative Conventions

The drawings are intended to illustrate implementations that are both drawn to scale and/or not drawn to scale. This means the drawings can be interpreted, for example, as showing: (a) everything drawn to scale, (b) nothing drawn to scale, or (c) one or more features drawn to scale and one or more features not drawn to scale. Accordingly, the drawings can serve to provide support to recite the sizes, proportions, and/or other dimensions of any of the illustrated features either alone or relative to each other. Furthermore, all such sizes, proportions, and/or other dimensions are to be understood as being variable from 0-100% in either direction and thus provide support for claims that recite such values or any and all ranges or subranges that can be formed by such values.

Spatial or directional terms, such as "left," "right," "front," "back," and the like, relate to the subject matter as it is shown in the drawings and/or how it is commonly oriented during manufacture, use, or the like. However, it is to be understood that the described subject matter may assume various alternative orientations and, accordingly, such terms are not to be considered as limiting.

Incorporation by Reference

The entire content of each document listed below is incorporated by reference into this document (the documents below are collectively referred to as the "incorporated documents"). If the same term is used in both this document and one or more of the incorporated documents, then it should be interpreted to have the broadest meaning imparted by any one or combination of these sources unless the term has been explicitly defined to have a different meaning in this document. If there is an inconsistency between any incorporated document and this document, then this document shall govern. The incorporated subject matter should not be used to limit or narrow the scope of the explicitly recited or depicted subject matter.

U.S. Prov. App. No. 62/748,247, titled "Vacuum Freezing Methods and Apparatuses," filed on 19 Oct. 2018.

U.S. Pat. No. 9,459,044 (application Ser. No. 13/841,251), titled "Freeze Drying Methods and Apparatuses," filed on 15 Mar 2013, issued on 4 Oct. 2016.

The invention claimed is:

1. A freeze-drying method comprising:
cooling a material to 32° F. or below in a chamber that is not pressurized and is at approximately ambient pressure to form a first cooled material;
cooling the first cooled material in the chamber to −30° F. or below to form a frozen material, wherein, before reaching −30° F., the first cooled material is cooled at least 10° F. by concurrently: (a) reducing the pressure in the chamber below ambient pressure to evaporate and/or sublimate water in the first cooled material and (b) actively cooling the chamber; and
drying the frozen material in the chamber by sublimating ice in the frozen material to water vapor.

2. The freeze-drying method of claim 1 comprising collecting at least a portion of the water vapor on an interior surface of the chamber.

3. The freeze-drying method of claim 1 comprising cooling the material to 10° F. or below in the chamber at approximately ambient pressure to form the first cooled material.

4. The freeze-drying method of claim 1 wherein cooling the first cooled material in the chamber to form the frozen material comprises reducing the pressure in the chamber from approximately ambient pressure to 2000 mTorr or below in a single step.

5. The freeze-drying method of claim 1 wherein drying the frozen material in the chamber includes heating the frozen material in the chamber to sublimate ice in the frozen material to water vapor.

6. The freeze-drying method of claim 5 wherein cooling the first cooled material in the chamber to form the frozen material comprises cooling the first cooled material to −10° F. or below.

7. The freeze-drying method of claim 1 wherein actively cooling the chamber comprises cooling an interior surface of the chamber to 0° F. or below.

8. The freeze-drying method of claim 5 wherein cooling the first cooled material to form the frozen material comprises cooling the first cooled material at a pressure of 2000 mTorr or below for at least 10 minutes before heating the frozen material in the chamber.

9. The freeze-drying method of claim 5 wherein cooling the material comprises cooling the material at least 15° F.

10. A freeze-drying method comprising:
cooling a material to a first temperature in a chamber that is not pressurized and is at approximately ambient pressure to form a first cooled material, the first temperature being above −25° F.;
cooling the first cooled material from the first temperature to −25° F. or below by reducing the pressure in the chamber below ambient pressure to evaporate and/or sublimate water in the material; and
drying the material in the chamber by sublimating ice in the material to water vapor.

11. The freeze-drying method of claim 10 comprising collecting at least a portion of the water vapor on an interior surface of the chamber.

12. The freeze-drying method of claim 10 wherein the first temperature is 10° F. or below.

13. The freeze-drying method of claim 10 comprising actively cooling an interior surface of the chamber to −30° F. or below.

14. A freeze-drying method comprising:
cooling a material in a chamber by initially cooling the material at approximately ambient pressure and without pressurizing the chamber followed by cooling the material from −15° F. to below −25° F. by reducing the pressure in the chamber below ambient pressure to evaporate and/or sublimate water in the material;
drying the material in the chamber by heating the material and sublimating ice in the material to water vapor; and
collecting at least a portion of the water vapor on an interior surface of the chamber.

15. The freeze-drying method of claim 14 wherein cooling the material in the chamber comprises cooling the material from −10° F. to below −25° F. by reducing the pressure in the chamber.

16. The freeze-drying method of claim 14 wherein:
cooling the material in the chamber includes:
cooling the material at approximately ambient pressure to 30° F. or below to form a first cooled material; and
cooling the first cooled material in the chamber from −15° F. to below −25° F. to form a second cooled material, the first cooled material being cooled by reducing the pressure in the chamber to evaporate and/or sublimate water in the first cooled material; and
drying the material in the chamber includes drying the second cooled material in the chamber by sublimating ice in the second cooled material to water vapor.

17. The freeze-drying method of claim 14 wherein cooling the material in the chamber from −15° F. to below −25° F. comprises reducing the pressure in the chamber to 2000 mTorr or below.

18. The freeze-drying method of claim 17 wherein cooling the material in the chamber from −15° F. to below −25° F. comprises reducing the pressure in the chamber from approximately ambient pressure to 2000 mTorr or below in a single step.

19. The freeze-drying method of claim 14 comprising actively cooling the interior surface of the chamber.

20. A freeze-drying method comprising:
cooling a material in a chamber that is not pressurized and is at approximately ambient pressure to 30° F. or below to form a first cooled material;
cooling the first cooled material in the chamber from −15° F. to below −25° F. to form a second cooled material, the first cooled material being cooled by reducing the pressure below ambient pressure in the chamber to evaporate and/or sublimate water in the first cooled material; and
drying the second cooled material in the chamber by sublimating ice in the second cooled material to water vapor.

21. The freeze-drying method of claim 20 wherein cooling the first cooled material in the chamber to form the second cooled material comprises cooling the first cooled material from −10° F. to below −25° F.

22. The freeze-drying method of claim 20 wherein cooling the first cooled material in the chamber lowers the temperature of the first cooled material at a rate of at least 0.25° F./min from −15° F. to below −25° F.

* * * * *